March 8, 1927.
H. J. GRENIER
CUE TIP FASTENER
Filed March 10, 1926
1,620,545
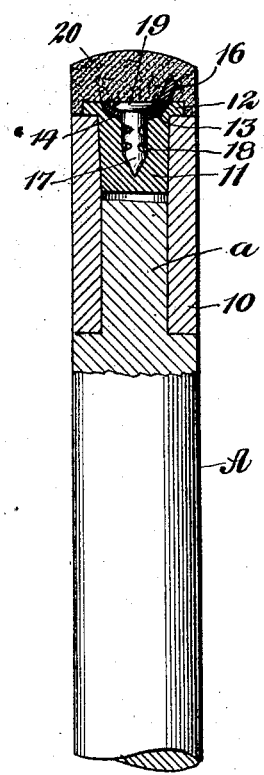
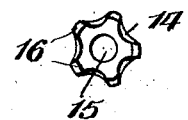
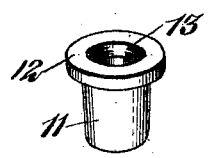
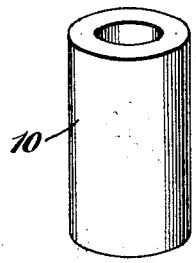
WITNESSES
INVENTOR
Henry J. Grenier
BY
ATTORNEYS Patented Mar. 8, 1927.

1,620,545

UNITED STATES PATENT OFFICE.

HENRY J. GRENIER, OF BRIDGEPORT, CONNECTICUT.

CUE-TIP FASTENER.

Application filed March 10, 1926. Serial No. 93,686.

My invention relates to cue tip fasteners and particularly to an assemblage involving the use of a pronged element to engage the cue tip and adapted itself to be securely fastened.

The general object of my invention is to provide a cue tip fastener improved in various particulars, especially with regard to the element for fastening the cue tip and the means for securing said element, whereby the tip will be held securely.

Reference is to be had to the accompanying drawings forming part of this specification, it being understood that the drawings are merely illustrative of one example of the invention.

Figure 1 is a view partly in section and partly in side elevation of a part of a cue equipped with a tip and my improved means for fastening the tip;

Figure 2 is a perspective view of the tip;

Figure 3 is a side elevation of the device for securing the tip fastening element;

Figure 4 is a plan view of the tip fastening element;

Figure 5 is a side elevation of the tip fastening element;

Figure 6 is a perspective view of a countersunk plug for engaging the sleeve on the cue;

Figure 7 is a perspective view of the cue sleeve.

In carrying out my invention in practice, in accordance with the illustrated example, the usual ferrule 10 is provided to fit the tenon or reduced end $a$ of the cue A. The body of a plug 11 has a tight tapered fit in the ferrule 10 and formed with an annular flange 12 directed radially outward to come to a bearing against the front end of said ferrule as shown clearly in Figure 1. At the interior, within the flange, 12 the plug 11 has a countersink or depression 13 formed usually with curved walls.

Associated with the plug 11 is a novel assemblage comprising a tip fastening element and a securing means therefor, the tip fastening element designated generally by the numeral 14 is substantially of crown shape and has a hole 15 in the bottom thereof through which a securing brad 17 or equivalent fastener may be driven into the plug 11. The tip fastening element 14 has a plurality of fingers 16 extending about the edge thereof. Said fingers 16 flare slightly as shown clearly in Figures 1, 4 and 5. The brad 17 is here shown as of the type having notches 18 in the shank thereof to cause an interlocking engagement with the material of the plug 11. Said securing device 17 also has a head 19.

In assembling the devices referred to, the plug 11 is driven home into the ferrule 10 until the flange 12 seats upon the forward edge of said ferrule. The element 14 to fasten the leather cue tip 20 is now placed on the plug 11 with its bottom in the countersink 13. The securing brad 17 or the like is now driven through the hole 15 and into the plug 11 to firmly engage said plug. The element 14 will now be disposed snugly between the concave countersink 13 and the head 19 so that the flaring form of the fingers 16 will be maintained and said fingers will tend to be deflected outwardly and not inwardly. The leather tip 20 is now placed against the outer end of the fingers 16 and pressure is applied to the front face of the said tip to cause the fingers 16 to penetrate the material of the tip. As the tip is forced to its seat partially against the outer end of the ferrule 10 and partially against the front face of the flange 12, the ends of the fingers 16 will be deflected at a more pronounced angle than the initial flare. Thus, the tip 20 will not only be firmly held by the fastener fingers 16 but the whole assemblage will be firmly held in position.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A cue tip fastening means including a plug adapted to be driven in the usual ferrule of a cue, a lateral annular flange on said tip adapted to seat on the front end of said ferrule, said plug having a concave countersink, a cue tip fastening element having a hole through the bottom thereof and formed with a flaring series of fingers disposed about the edge thereof, a securing brad passing through said hole and engaging the material of said plug, and a cue tip disposed jointly against said flange and ferrule, in which material of the tip said fingers are entered, the outer ends of the fingers being deflected laterally outward.

2. In a cue tip fastener means, a plug adapted to be applied to the end of a cue, a tip fastener element having a hole in the bottom thereof and formed with flaring series of fingers disposed about the same, and a brad-like securing device passing through said hole and firmly engaging the material of said plug, said plug having a countersink in the front thereof receiving the bottom portion of said tip fastening element, and said brad-like securing device having a head engaging said fastening element about the hole therein and firmly holding the same in said countersink.

HENRY J. GRENIER.